(12) United States Patent
Cotton et al.

(10) Patent No.: US 9,193,455 B2
(45) Date of Patent: Nov. 24, 2015

(54) FLY BY WIRE SERVOS WITH INTERNAL LOOP CLOSURE

(71) Applicant: Sikorsky Aircraft Corporation, Stratford, CT (US)

(72) Inventors: Bryan S. Cotton, Poplar Grove, IL (US); Matthew Harrigan, Horseheads, NY (US); Christopher L. Winslow, Trumbull, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/184,356

(22) Filed: Feb. 19, 2014

(65) Prior Publication Data

US 2015/0232177 A1 Aug. 20, 2015

(51) Int. Cl.
*B64C 27/64* (2006.01)
*B64C 27/57* (2006.01)
*B64C 27/68* (2006.01)

(52) U.S. Cl.
CPC .................. *B64C 27/64* (2013.01); *B64C 27/57* (2013.01); *B64C 27/68* (2013.01)

(58) Field of Classification Search
USPC ............................................................ 701/3
See application file for complete search history.

(56) References Cited

U.S. PATENT DOCUMENTS

| 4,542,679 | A | | 9/1985 | Murphy et al. |
| 5,615,593 | A | * | 4/1997 | Anderson et al. ................. 91/24 |
| 7,786,684 | B2 | * | 8/2010 | Hanlon et al. ................ 318/135 |
| 7,828,245 | B2 | | 11/2010 | Suisse et al. |
| 8,245,967 | B2 | * | 8/2012 | Kirkland ..................... 244/76 R |
| 8,380,473 | B2 | * | 2/2013 | Falangas ........................... 703/8 |
| 8,474,752 | B2 | * | 7/2013 | Kirkland ..................... 244/76 R |
| 2004/0078121 | A1 | * | 4/2004 | Cartmell et al. .................... 701/3 |
| 2006/0171264 | A1 | * | 8/2006 | Zhou et al. ................. 369/44.27 |
| 2009/0048689 | A1 | * | 2/2009 | Pelton et al. .................... 700/33 |
| 2010/0127132 | A1 | | 5/2010 | Kirkland |
| 2011/0108671 | A1 | * | 5/2011 | Soronda ....................... 244/195 |
| 2011/0270471 | A1 | * | 11/2011 | Andre ............................... 701/3 |
| 2013/0116863 | A1 | * | 5/2013 | Goupil et al. ................... 701/14 |
| 2014/0000352 | A1 | * | 1/2014 | Gueit et al. ................ 73/112.01 |

OTHER PUBLICATIONS

European Search Report for application EP 15155772.5, Sep. 3, 2015, 8 pages.

\* cited by examiner

*Primary Examiner* — Thomas Tarcza
*Assistant Examiner* — Alex C Dunn
(74) *Attorney, Agent, or Firm* — Cantor Colburn LLP

(57) ABSTRACT

Embodiments are directed to obtaining a first analog signal corresponding to a position error between a commanded gang output of a plurality of electro-mechanical actuators configured to be run in parallel with one another and a measured gang output of the plurality of electro-mechanical actuators, obtaining a second analog signal corresponding to an output torque, and processing, by a circuit, the first analog signal and the second analog signal to generate and output a discrete that indicates a status of the torque in terms of direction and magnitude.

17 Claims, 9 Drawing Sheets

FLY BY WIRE SERVOS WITH INTERNAL LOOP CLOSURE

BACKGROUND

Servomechanisms or servos may be used in connection with an aircraft. For example, in fly by wire (FBW) systems an aircraft may use servos to actuate the aircraft's control surfaces.

In conventional aircraft platforms, the servos are "dumb" in the sense that they do not include processing capabilities. Control and coordination for the servos is provided via one or more highly-customized flight control computers (FCCs). The use of such FCCs tends to be expensive in terms of development and validation/certification. Furthermore, the communication or linkage between an FCC and the servos tends to be point-to-point via dedicated channels. Accordingly, the implementation tends to be "wire-intensive," which leads to an increase in terms of weight and complexity and reduced reliability and safety.

BRIEF SUMMARY

An embodiment is directed to a servo assembly comprising: a hydraulic primary servo, a plurality of electro-mechanical actuators coupled to the primary servo and configured to drive the primary servo, and at least one device configured to perform loop closure.

An embodiment is directed to a system comprising: at least one flight control computer, and at least one servo assembly coupled to the at least one flight control computer comprising: a hydraulic primary servo, a plurality of electro-mechanical actuators coupled to the primary servo and configured to drive the primary servo, and at least one device configured to perform loop closure.

An embodiment is directed to a method comprising: obtaining a first analog signal corresponding to a position error between a commanded gang output of a plurality of electro-mechanical actuators configured to be run in parallel with one another and a measured gang output of the plurality of electro-mechanical actuators, obtaining a second analog signal corresponding to an output torque, and processing, by a circuit, the first analog signal and the second analog signal to generate and output a discrete that indicates a status of the torque in terms of direction and magnitude.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
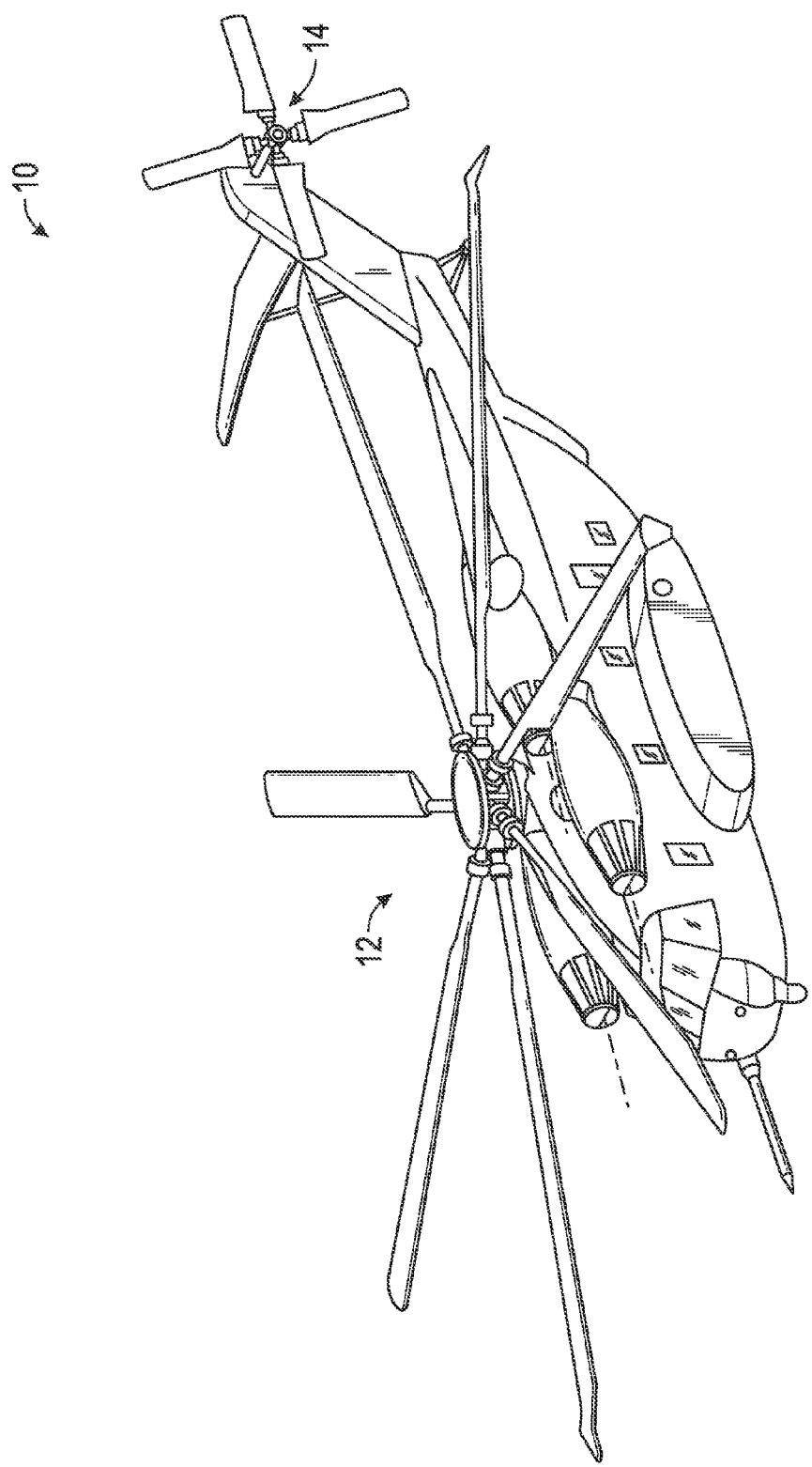
FIG. 1A is a general perspective side view of an exemplary aircraft.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are directed to a servo assembly comprising an electro-mechanical actuator (EMA) gang that drives a hydraulic primary servo to implement control. The EMA gang may include any number of EMAs, such as two or more EMAs. The servo may include any number of stages. In some embodiments, an aircraft configured in accordance with a fly by wire (FBW) architecture may include the servo assembly. Loop closure may be performed at a servo, such that the servo can be coupled to virtually any type of computer (e.g., flight control computer (FCC)). In this manner, the cost associated with the computer may be substantially reduced relative to conventional implementations. Each of the EMAs may be controlled in parallel by a separate FBW channel.

Referring now to FIG. 1A, a general perspective view of a helicopter 10 is shown. The helicopter 10 includes a main rotor assembly 12 and tail rotor assembly 14. Although a particular helicopter configuration is illustrated and described in the disclosed embodiment, other configurations and/or machines may be used in connection with this disclosure.

Figure 1B:
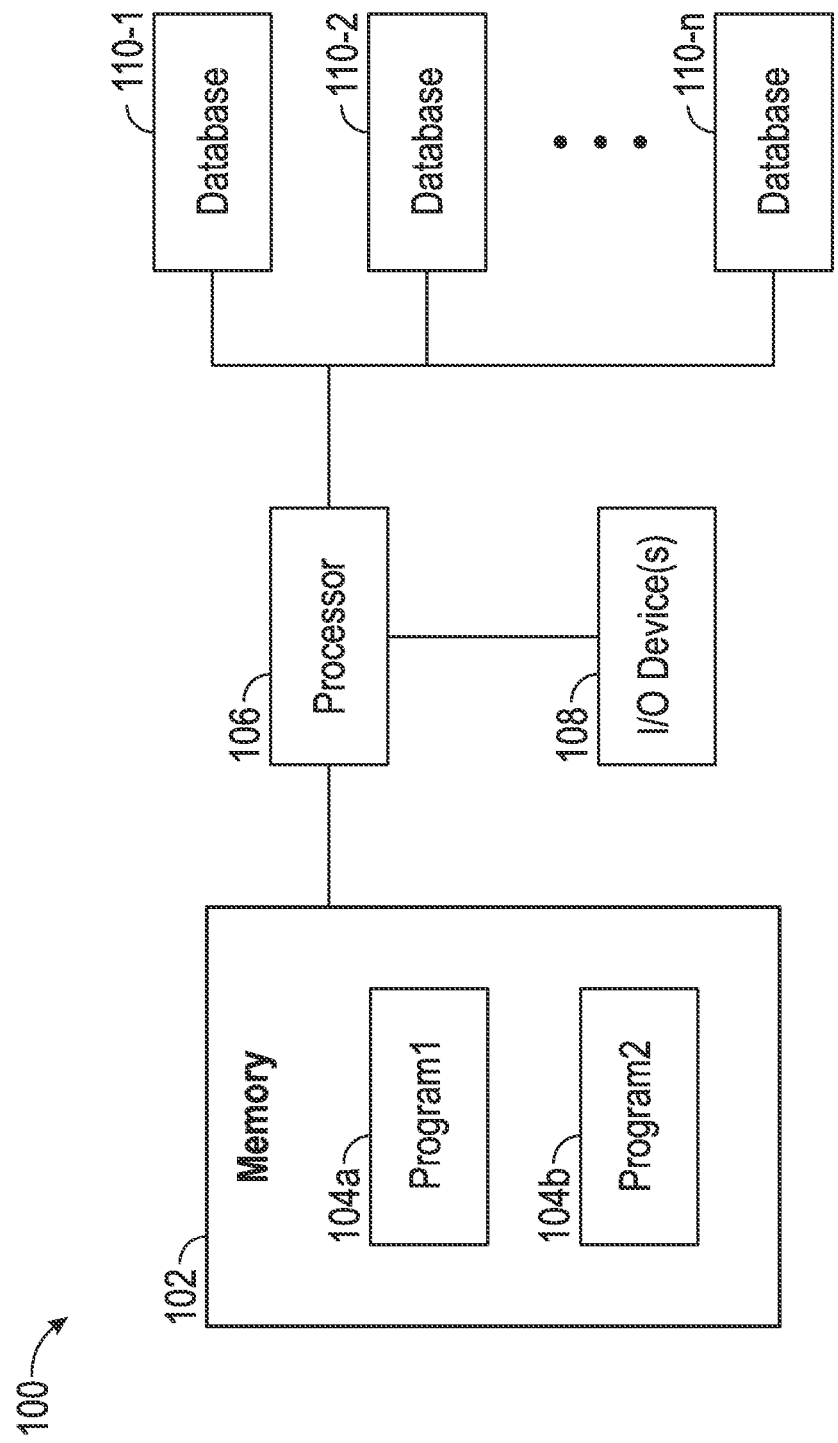
FIG. 1B is a schematic block diagram illustrating an exemplary computing system.

Referring to FIG. 1B, an exemplary computing system 100 is shown. Computing system 100 may be part of a flight control system of the aircraft 10. The system 100 is shown as including a memory 102. The memory 102 may store executable instructions. The executable instructions may be stored or organized in any manner and at any level of abstraction, such as in connection with one or more applications, processes, routines, procedures, methods, etc. As an example, at least a portion of the instructions are shown in FIG. 1B as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a control stick, a joystick, a printer, a telephone or mobile device (e.g., a smartphone), a sensor, etc. The I/O device(s) 108 may be configured to provide an interface to allow a user to interact with the system 100.

As shown, the processor 106 may be coupled to a number 'n' of databases, 110-1, 110-2, ... 110-n. The databases 110 may be used to store data, such as data associated with one or more servos or servo assemblies.

The system 100 is illustrative. In some embodiments, one or more of the entities may be optional. In some embodiments, additional entities not shown may be included. In some embodiments, the entities may be arranged or organized in a manner different from what is shown in FIG. 1B. For example, in some embodiments, the memory 102 may be coupled to or combined with one or more of the databases 110.

Figure 2A:
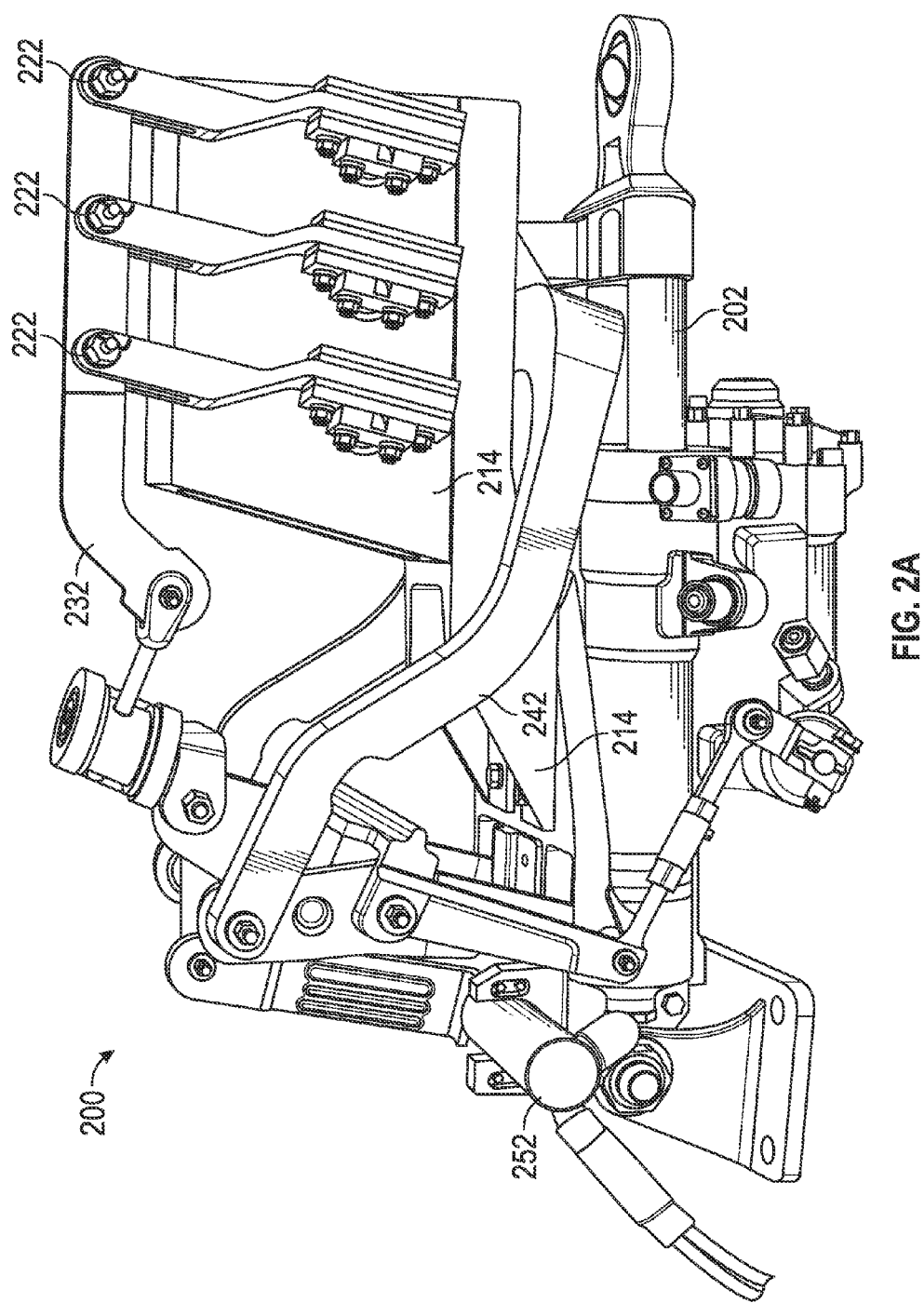
FIGS. 2A-2B illustrate side-perspective views of a servo assembly.
Figure 2B:
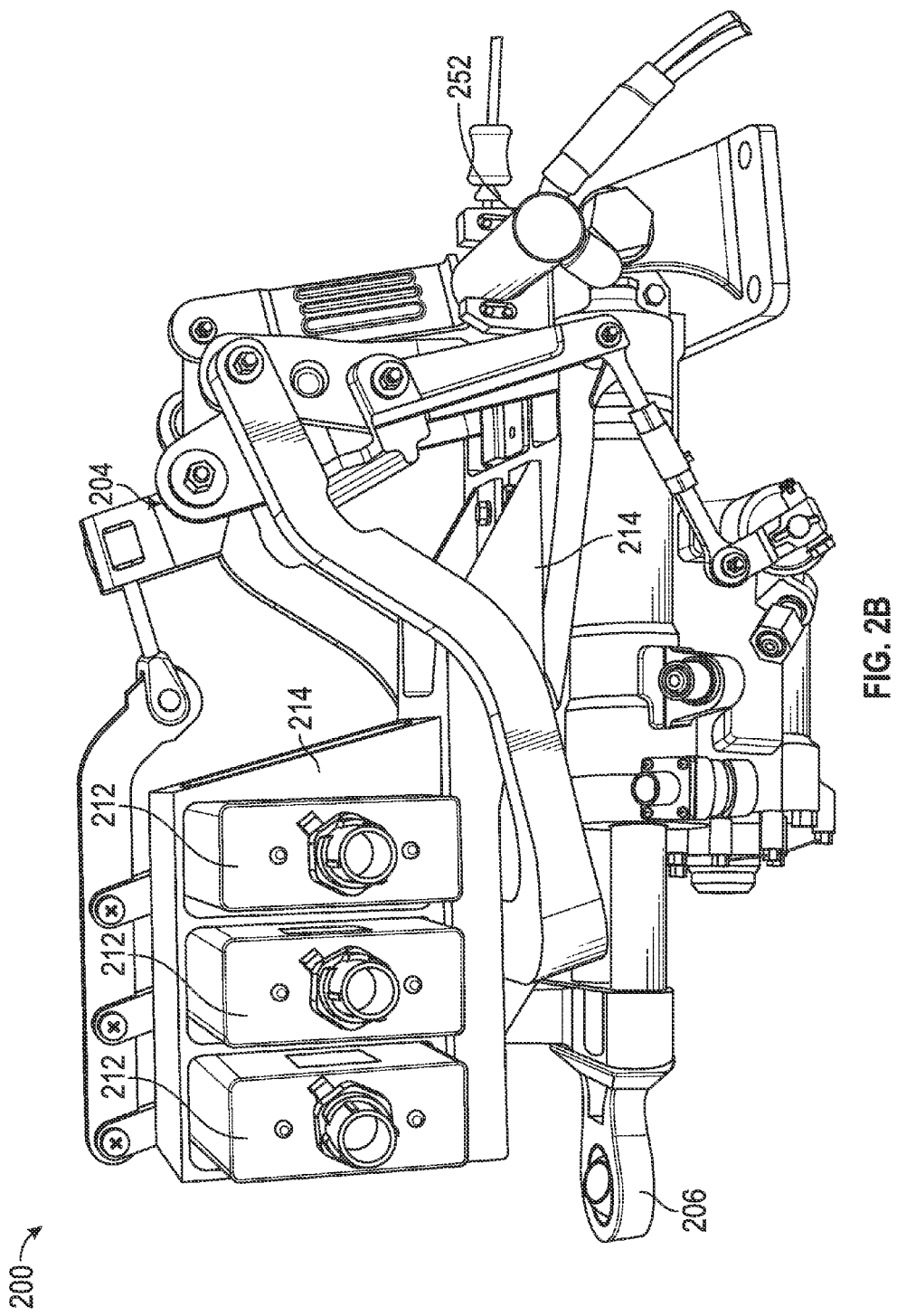

Turning to FIGS. 2A-2B (which are collectively referred to herein as FIG. 2), a servo assembly 200 in accordance with one or more embodiments is shown. The servo assembly 200 may include a primary servo 202. The primary servo 202 may be used to control one or more loads. The primary servo 202 may perform a function analogous to power-steering available on an automobile. For example, the primary servo 202 may translate an input force of, e.g., one pound into an output or applied force of, e.g., five-thousand pounds. The primary servo 202 may be responsive to, or associated with, a mechanical input 204 and may be used to drive a ram output 206.

The servo assembly 200 may include one or more EMAs, such as EMAs 212. The EMAs 212 may be powered off of a 28 VDC electrical bus and communicate to an FCC (not shown) via a serial bus. In some embodiments, a user or pilot may interface to the FCC via controls or buttons. Position commands may be transmitted by the FCC over the serial bus, and each servo assembly 200 or EMA 212 may accept the commands and use a digital-to-analog converter (DAC) to send the command to an input of an analog control loop. The EMAs 212 may be configured to run in parallel with one another, as opposed to an active-standby configuration that is typical of conventional platforms wherein a first EMA is active and any additional EMAs are in an inactive or standby state at least until the first EMA fails.

The EMAs 212 may be mounted on an assembly 214. The assembly 214 may be made of one or more materials. The materials may be selected to ensure integrity (e.g., mechanical integrity) while minimizing weight.

Each EMA 212 may include, or be associated with, an arm 222. The outputs associated with the arms 222 may be controlled by separate or independent FBW channels. Damping and flexibility may be provided by an elastomer between an EMA shaft and its arm 222.

The arms 222 may be coupled to a summation bar 232. The summation bar 232 may provide for a mechanical summation or averaging for differences in EMA 212 outputs.

The servo assembly 200 may include a modified feedback arm 242. The feedback arm 242 may move one or more spool valves based on a position different between an input to a servo and an output of the servo. The feedback arm 242 may make room for an EMA gang to be mounted, such as in embodiments where space is limited.

The servo assembly 200 may include one or more sensors 252. The sensor 252 may include one or more rotary variable differential transformers (RVDTs). An RVDT may include one or more coils (e.g., two coils). The sensor 252 may include one or more linear variable differential transducers (LVDTs). The sensor 252 may measure a position of the summation bar 232, which may be used to determine a spool valve position and/or ram position. The EMAs 212 may position the summation bar 232 to the desired ram position which the sensor 252 senses. The difference between the actual and desired ram position may result in motion on the spool valve to drive the ram to the desired position.

As described above, the EMAs 212 may be controlled by one or more FCCs via a communication bus. The communication bus may adhere to one or more communication conventions, protocols, or standards, such as RS485, RS232, ARINC 629, AFDX, etc. In some embodiments, the communication bus may correspond to 4-wires. The communication bus may be used for purposes of command, control, and status feedback. In some embodiments, the communication bus may be routed from an FCC to a central point near a plurality of servo assemblies 200, and then short wire runs may be made from the communication bus to each servo assembly 200.

The EMAs 212 may be supplied with, e.g., 28 VDC via a power/electrical bus. Much like the communication bus described above, the electrical bus may be run to the vicinity of a plurality of servo assemblies 200, and then short wire runs may be made from the electrical bus to each servo assembly 200.

The use of communication and electrical buses may provide for a significant reduction in wire count relative to conventional platforms. The effect or impact of a reduction in wire count may be great on a large aircraft. For example, a reduction in wire count results in a corresponding reduction in weight. Furthermore, reducing the count of wires reduces complexity and increases reliability.

In some embodiments, a FCC may need to interface to and control one or more servos or servo assemblies. For example, the FCC may need to excite and read the sensor 252. The FCC may need to incorporate current drives that control spool valves of a servo or servo assembly. In conventional platforms, loop closure for each servo or servo assembly may be done or performed in the FCC. Loop closure as used herein may entail obtaining information or data regarding: (1) the position of the spool valve, and (2) the position of the ram.

Performing loop closure at the FCC may impose costs in terms of requiring development of a custom FCC for a given aircraft or aircraft platform. Furthermore, the presence of functionality within the FCC imposes requirements in terms of power and thermal management. For example, whatever input power is actually provided to the FCC must be conditioned for electronics that consume power inside the FCC. The conditioning may entail the inclusion of converters, inverters, and power electronics. All the electronic components and devices within the FCC may dissipate power, the power dissipation may result in a generation of heat within the FCC. As power dissipation, and hence heat, increases, it may be increasingly difficult to stay within a qualified temperature range without imposing forced cooling.

In accordance with one or more embodiments, loop closure may be performed at the servo or servo assembly. In this respect, devices or resources may be allocated to the servo or servo assembly, potentially in lieu of allocating such devices or resources to the FCC. In this manner, the design and implementation of the FCC may be simplified, power dissipation associated with the FCC may be reduced/minimized, and the FCC may potentially be reused across a number of aircraft platforms or configurations. Furthermore, reducing the complexity of the FCC may allow the FCC to be sourced or obtained from a wider number of vendors.

In conventional platforms, hydraulic dual (or triple) stage servos have parallel rams. Both rams extend and retract together. They are tied together by a yoke, which is then attached to a stationary swashplate. The servos and hydraulic system may be sized so the entire maneuver spectrum can be flown safely on a single hydraulic stage. The second (or third) stage is typically present for redundancy. If one stage tries to retract, and one stage tries to extend, the yoke that ties the two rams together is under significant stress. The static strength required to react the static load of the force fight is not the only consideration. The servo must also to have a good fatigue life considering both the force fight and the N/revolution loads that are typical for primary servos. Designing for large force fights is one of the real liabilities of having parallel rams that can be independently controlled, as is typical in current FBW flight control systems.

As described above, the EMAs (e.g., EMAs 212) may work independent of one another and in parallel, thereby introducing the potential for another force fight. However, this additional force fight is small (e.g., typically fractions of a pound) for normal operations. Hydraulic servos may have small force fights during normal operations as well. In case of a failure, the EMAs will generate a force fight with magnitudes in the tens of pounds, whereas a failure for a conventional FBW servo may result in a force fight on the order of thousands of pounds. Also, for a force fight of EMAs that results in a failure, the primary load path through the hydraulic servo is uncompromised. This is a much different fault than breaking the yoke between hydraulic stages as in a conventional platform, where control of the swashplate will be compromised.

In conventional platforms, a spool valve design may be used that in steady state bypasses hydraulic fluid without performing mechanical work. The energy put into the fluid turns into heat, requiring a heat exchanger to remove the heat. The addition of the heat exchanger represents an increase in weight and complexity.

Embodiments of the disclosure might not include electro-hydraulic spool valves. Instead, conventional spool valves and variable displacement hydraulic pumps may be used, resulting in minimal waste of hydraulic energy that turns into heat.

Figure 3:
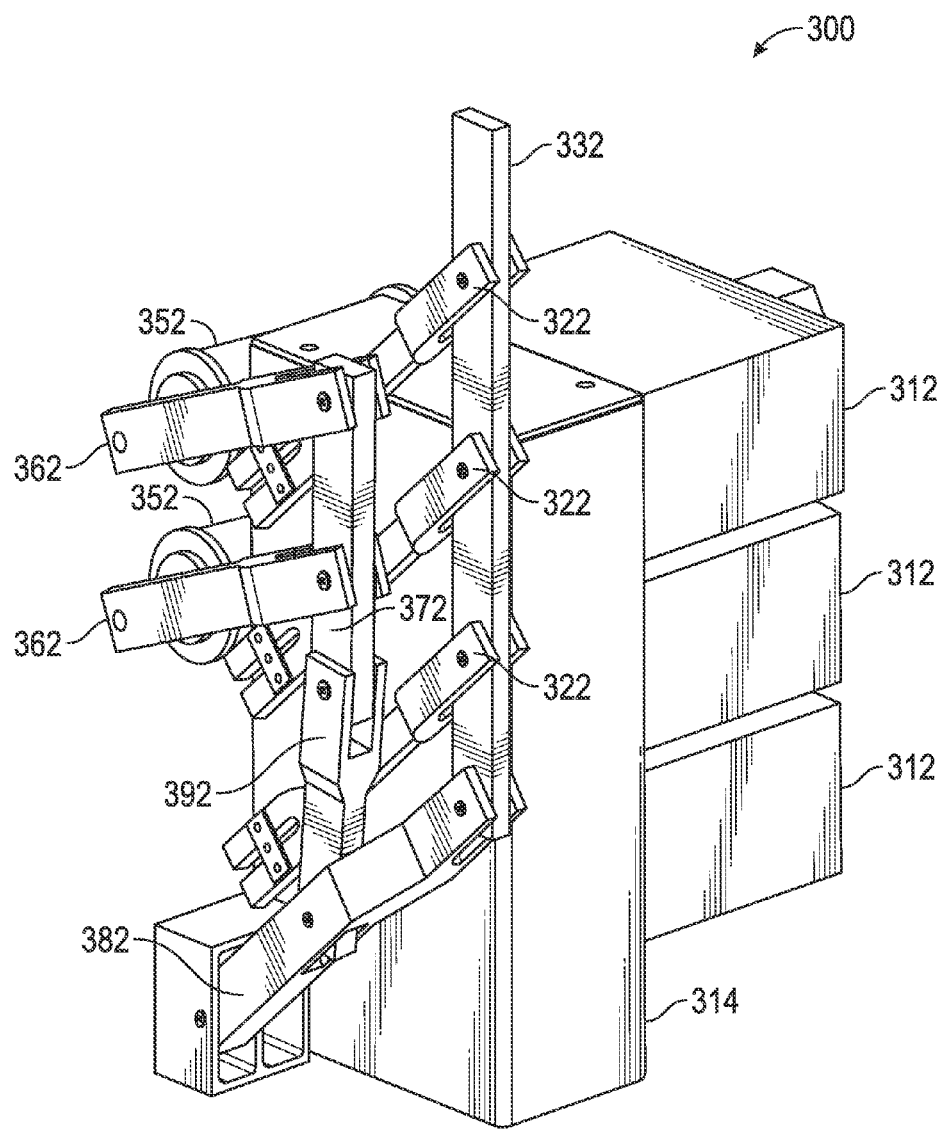
FIG. 3 illustrates a servo assembly.

Referring to FIG. 3, a servo assembly 300 in accordance with one or more embodiments is shown. The servo assembly 300 may include one or more EMAs, such as EMAs 312 (which may correspond to EMAs 212). The servo assembly 300 may include a mounting structure or assembly 314 (which may correspond to assembly 214). The mounting structure 314 may be made of sheetmetal. The servo assembly 300 may include EMA output arms 322 (which may correspond to arms 222). The servo assembly 300 may include a summation bar 332 (which may correspond to summation bar 232). The servo assembly 300 may include sensor(s) 352 (which may correspond to sensor(s) 252). The servo assembly 300 may include sensor input arms 362, where a given sensor input arm 362 may be associated with or coupled to a given sensor 352. The servo assembly 300 may include a sensor positioning bar 372 coupled to the sensor input arms 362. The servo assembly 300 may include an idler arm 382 coupled to the summation bar 332 and an idler linkage 392. The idler linkage 392 may be coupled to the sensor positioning bar 372.

In some embodiments, flexibility may be designed into the servo assembly 300. For example, if an EMA 312 is running at a full stall torque of one-hundred fifty in-lbs, a corresponding arm 322 may allow for, e.g., approximately three degrees of deflection. Flexibility may be provided in the mounting structure 314. In some embodiments, no load may be transmitted by the idler arm 382, idler linkage 392, sensor input arms 362, or sensors 352, with the potential exception of a minimal amount of friction. The minimal loads may enable the sensors 352 to measure the actual position of the summation bar 332 accurately. A nominal load that any EMA 312 may experience may be low, e.g., approximately 4 in-lbs under worst-case conditions.

In some embodiments, solid output arms 322 and a stiff machined mounting structure 314 may be used. Flexibility may be provided by using a rubber interface between the EMA 312 output and the output arms 322.

Figure 4:
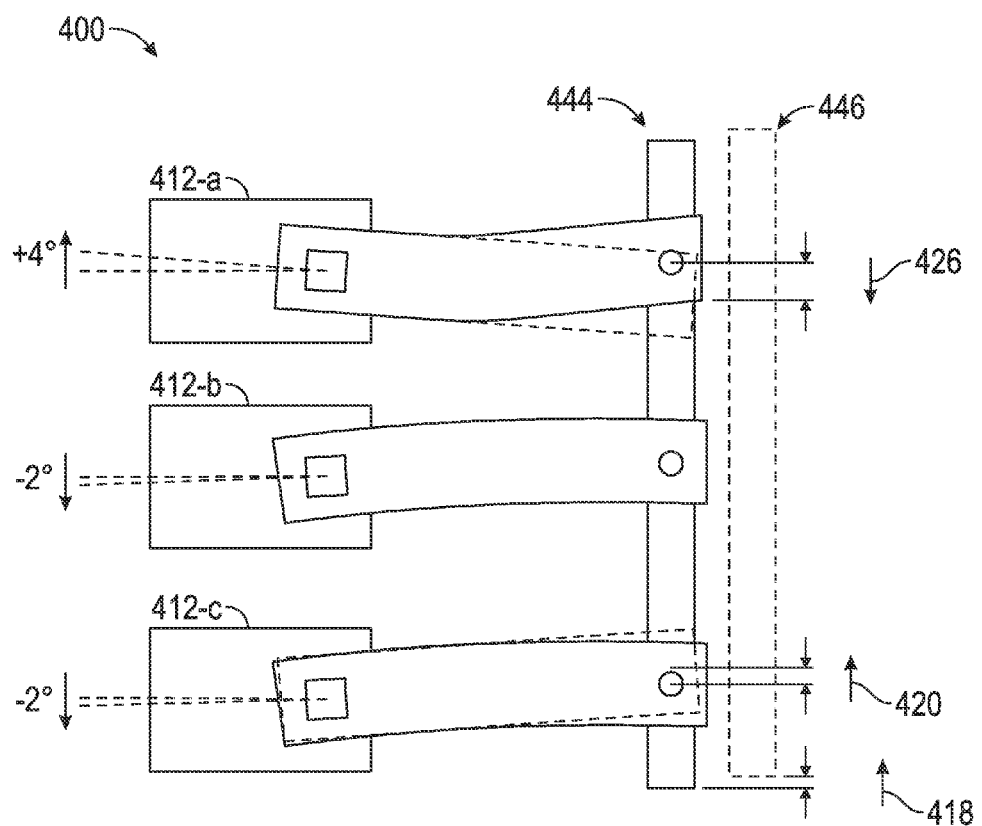
FIG. 4 is a diagram of a system used to illustrate a torque calculation for a servo assembly or electro-mechanical actuator (EMA) gang.

Referring now to FIG. 4, a system 400 in accordance with one or more embodiments is shown. The system 400 may be used to illustrate a torque calculation for a servo assembly or EMA gang.

In the embodiment of FIG. 4, a first EMA 412-a may be in a failed state or condition and may be providing a drive in a clockwise direction. A second EMA 412-b and a third EMA 412-c may be in a healthy state or condition and may attempt to provide drive in a counterclockwise direction. The EMAs 412-b and 412-c may supply about half the torque needed to counter the EMA 412-a. An output or position error 418 may be generated because of the resulting force fight. The torque 420 from the EMAs 412-b and 412-c may serve to reduce the error 418 by countering the torque 426 from the EMA 412-a. In this respect, a measured output 444 of a sensor (e.g., an RVDT) may start to converge to a desired output 446. Torque (e.g., total torque) may be calculated as a function of (e.g., a difference between) EMA feedback and independent output feedback, and a spring constant associated with an output arm. Each channel associated with an EMA may calculate torque with no knowledge of the other EMA channels, potentially as an inline calculation.

Figure 5:
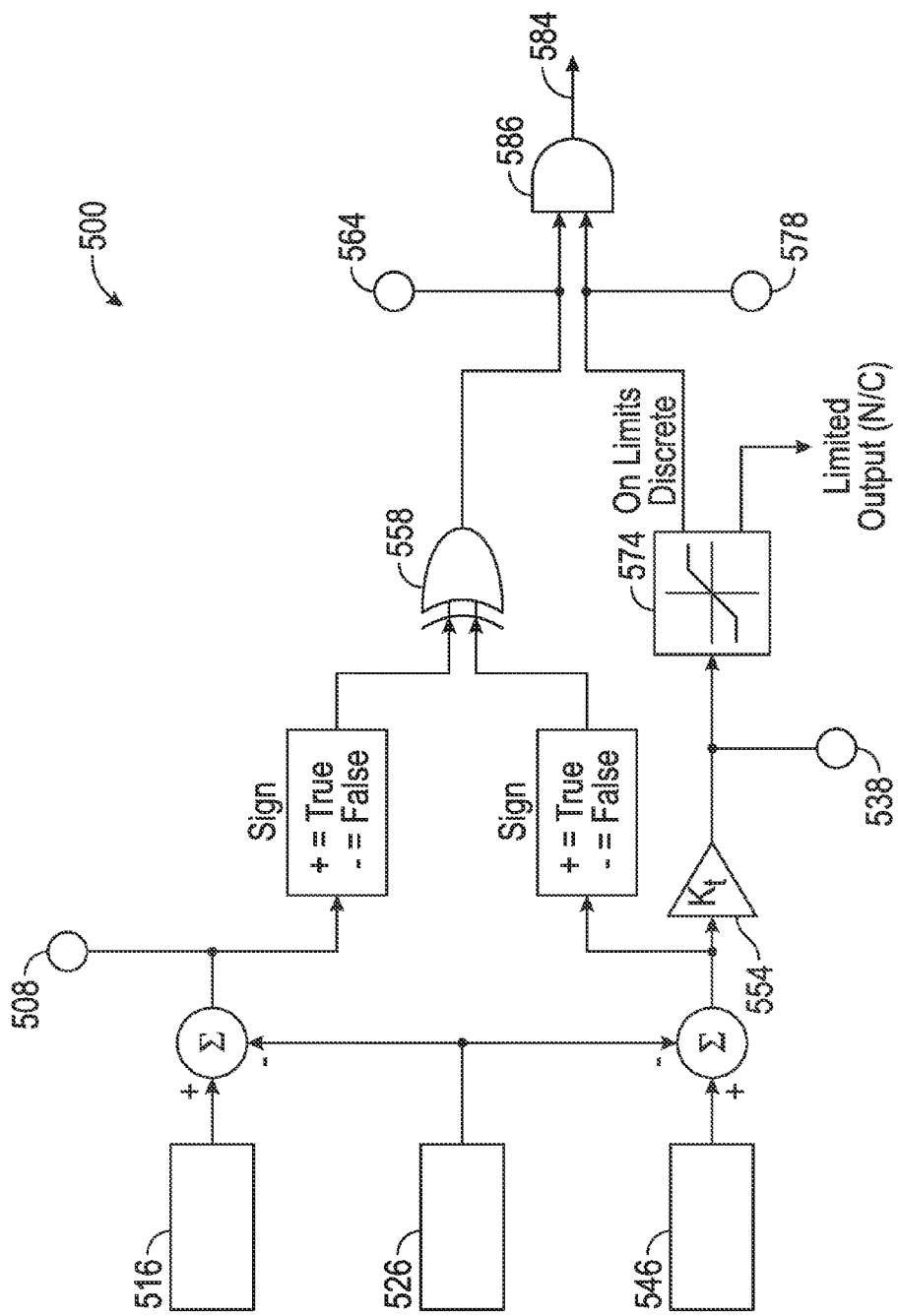
FIG. 5 is a diagram of a circuit used to generate a torque discrete output.

Turning to FIG. 5, a system 500 in accordance with one or more embodiments is shown. The system 500 may be used to detect torque failure associated with a servo assembly or EMA gang.

In conjunction with the system 500, two analog signals may be calculated to detect a condition of torque health or failure. The first signal may be a position error associated with a node 508. Position error 508 may be defined as a difference between a desired gang output 516 versus a measured gang output 526. The desired output 516 may correspond to a calculation of mixing equations. The measured output 526 may be obtained from, e.g., a data concentrator unit (DCU). Sensors (e.g., RVDTs) may be used for the measurement, and the sensor signal(s) passed to each channel may be error checked and voted via a cross channel data link (CCDL).

The second analog signal calculated is torque 538, which may correspond to a "rough order of magnitude" type measurement. With no force on the gang output, and no miscompare between three EMAs in the gang, there may be no load on an output arm. In such a case, the position of a summation bar may be a direct function of a position 546 of the EMA rotary output shaft. In the case of a force fight, a spring constant of the output arm may cause a miscompare between the position 546 of the EMA rotary output shaft and the output summation bar. The magnitude of this miscompare may be proportional to the torque of the EMA. As shown in FIG. 5, the torque 538 may be a function of (e.g., a difference between) the EMA position 546 and the measured gang output 526, potentially subject to a scaling (Kt) 554.

On these two analog signals 508 and 538, the sign may be the same if an EMA is working to drive the position error of the output summation bar to zero. If the signs are different, the EMA may be driving in the wrong direction. As shown in FIG. 5, the sign of the signal 508 may be compared to the sign of the signal 538 (prior to scaling 554) via XOR logic 558 to drive a torque direction error discrete 564.

If the magnitude of the torque 538 is small, no problem or failure may be detected. For example, normal operation may incur some small miscompares or discrepancies between each of three EMAs. However, if the magnitude of the torque exceeds a threshold, then it may be important that the EMA is attempting to drive the error of the output summation bar to zero. In the system 500, a limiter 574 may be used to determine if this threshold has been crossed. An analog output of the limiter 574 might not be used, but a discrete output 578 that indicates the on-limit condition is. The output 584 of the system 500, which may indicate a fault or failure when either or both of the torque direction error discrete 564 and the torque magnitude error discrete 578 indicates an error, may be reported on a downlink. AND logic 586 may be used to drive the output 584. In some embodiments, a 100 millisecond persistence test may be used to determine a failed condition requiring an EMA to be turned off.

In some embodiments, it may be desirable to limit the amount of force fight described above as much as possible. A number of approaches may be used to limit these force fights to a small level. For example, vendor acceptance test procedures (ATPs) may be tightened (e.g., a range on tolerances may be reduced) with respect to a commanded versus absolute position for each EMA. A gang mounting box may be changed from a low precision riveted sheetmetal structure to a high precision machined structure. Rotational biases for each EMA may be calculated to remove effects of imprecision.

In some instances, a servo assembly or EMA gang may be subject to a number of failure modes. These failure modes include an EMA jam, loss of communication, sensor (e.g., RVDT) failure, and any single or dual loss of EMAs on a servo assembly. These failure modes are described further below.

An EMA jam may correspond to a condition where if a first EMA is locked in place, the first EMA would prevent other EMAs from moving the input to a primary servo, causing a loss of control. The impact of an EMA jam may be mitigated by the functioning EMAs first yielding and then shearing the jammed EMA output shaft, restoring full control in short order.

Figure 6:
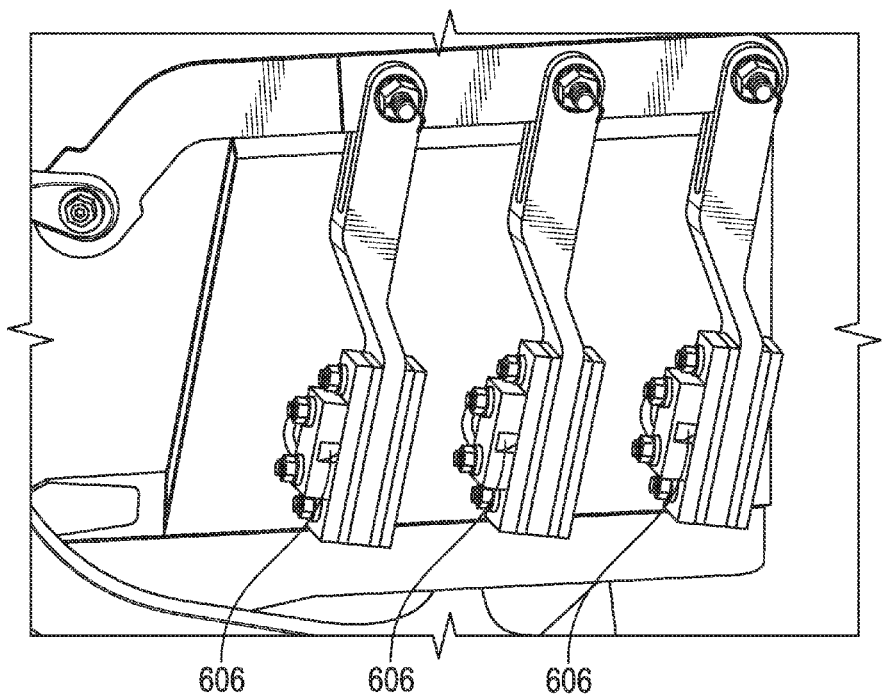
FIG. 6 illustrates EMA pivot points.
Figure 7A:
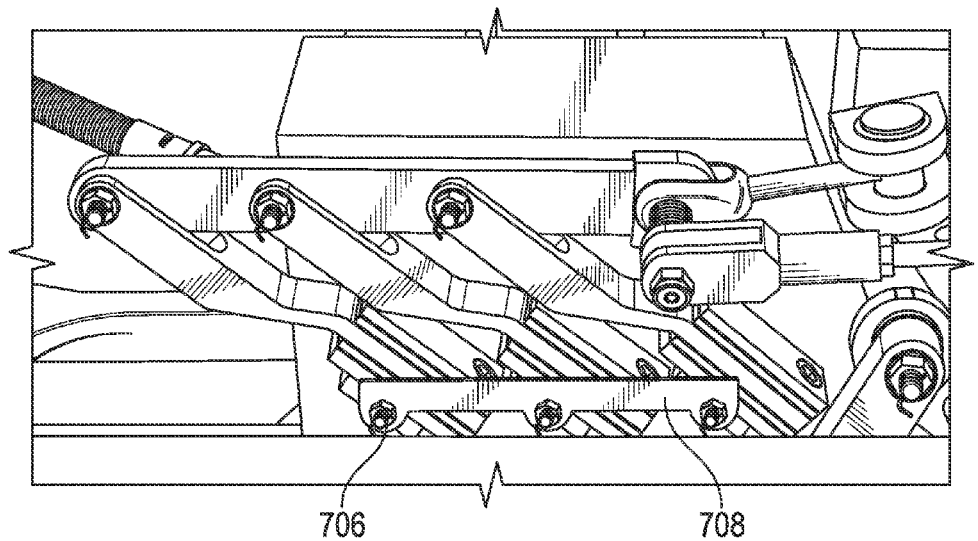
FIGS. 7A-7B illustrate an EMA retention bar, screws and bushings in accordance with one or more embodiments.
Figure 7B:
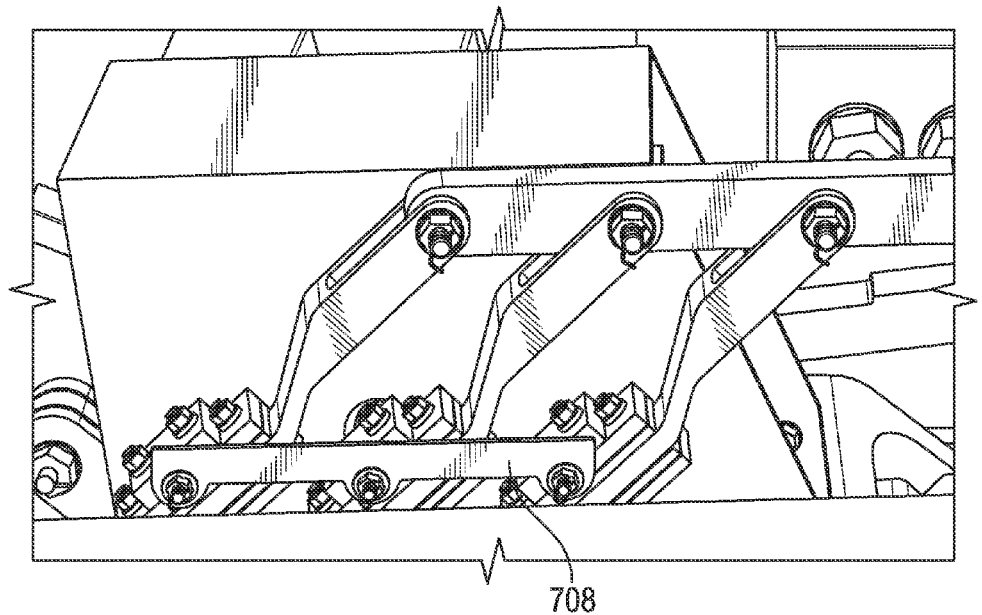

To mitigate against a secondary jam (e.g., where an EMA output arm could rotate around and jam on something else), a secondary sheetmetal bar may be mounted at the pivot points to keep the EMA output arm pivoting about the same point in the event of a shear. This arm is shown in FIGS. 6, 7A and 7B. As shown in FIG. 6, EMA pivot points 606 may be associated with a square output shaft with a threaded hole in the center. As shown in FIGS. 7A-7B, a servo assembly may include three screws and bushings 706. The screws and bushings 706 may turn with the EMA. A retention bar 708 may ride on the bushings 706.

A loss of communication may refer to either the loss of the ability to talk to (e.g., transmit to) an EMA over a communication bus (e.g., an RS485 bus), to hear from (e.g., receiver from) the EMA, or both. In the case where communication transmitted to the EMA is ineffective, the failure may be analogous to an EMA jam as the EMA may remain in a position corresponding to a prior command. The EMAs may be programmed to provide status after they receive a valid command. This ensures no conflicts on the communication lines that the EMAs transmit on. If the EMAs do not receive commands, they might not transmit status. The side effect of this is that if communication is lost from an EMA to an FCC, an assumption may be made that the EMAs have not received their command and are electrically jammed.

Detected loss of communication may result in an EMA being turned off, so the remaining EMAs can move the input to the primary servo with a minimum of additional resistance. A component or device referred to as a relay box, which is described further below, may be used to turn off an EMA. An exception may be made so as to not turn off an EMA based upon loss of communication if the EMA in question was the last one alive or healthy in a servo assembly or gang. At that point, it may be better to command the EMA in case there is just a loss of the EMAs ability to transmit back to the FCC.

Sensors (e.g., RVDTs) may be used for initialization of a FBW system on startup. The primary servo input position as measured by the sensors may be fed into inverse mixing equations to calculate the initial positions of pitch cyclic, roll cyclic, collective, and differential collective. The EMAs may then be commanded to the corresponding position to hold the input of the primary servo position steady until hydraulic pressure is sensed. Sensors may be used in the torque calculation to determine if an EMA has run away or faulted in terms of position, as described above.

In some embodiments, the sensors may be separate from an EMA itself, and read via conventional means. In an embodiment incorporating three sensors, a selected value may be calculated as a median value for all sensors operating, the average value for two sensors operating, and the valid value if only one sensor was operational. A failure of one or two sensors for either initialization or for torque detection may reduce the accuracy of the calculation slightly. Loss of all sensors may require that the EMA position itself be used for initialization, and in flight may entail a loss of torque calculation as used for detection of a runaway EMA. In either case, the servo or servo assembly may continue to operate normally.

As described above, for detected failures EMAs may be turned off. If power is lost in one entire FBW channel, the EMAs associated with that channel may also effectively be turned off. When an EMA is turned off, it may still be mechanically connected to the other EMAs through mechanical components. The remaining or healthy EMAs (or EMA) may drive the dead or failed EMA (or EMAs) as well as the input to the primary servo. With, e.g., one, two, or three EMAs operating, it is possible to command the full range of motion of a servo.

There is an effect associated with frequency response as EMAs fail. The bandwidth of a typical EMA or any electric servo may decrease with increasing load. Each EMA unloaded may have a frequency response of approximately 15 Hz. This may be well in excess of the capability of the primary servo, which may have a frequency response of approximately 8 Hz. When the EMAs are operating normally, they may essentially be unloaded as the input to the primary may be less than a half pound. When one EMA is turned off, the frequency response may drop to approximately 12 Hz, which is still above the cut off frequency of the primary servo. When two EMAs are turned off, a remaining EMA may experience additional loads, and approximately a half Hz of frequency response may be lost when the entire system of EMAs and the primary servo are considered together. This still results in acceptable flying qualities, and could be mitigated with changes in EMA component inertias, gear ratios, and friction.

As described above, a relay box may be used to turn off an EMA in case of a failure. The relay box may include solid state switches that are controlled by discrete inputs. Individual discrete inputs may be used to turn on and off individual EMAs, and these discrete inputs may be controlled by an FCC in a given channel. In some embodiments, a master enable/disable input may be provided, which may be controlled by a second FCC in the given channel. This type of architecture may allow either of the two dissimilar computers/FCCs to be able to disable an EMA or a channel. In some embodiments, the functionality of the relay box described above may be integrated into the EMA itself.

In some instances, an EMA gang assembly, a spool valve, and a primary servo may exhibit a small, non-divergent oscillation of approximately 40 Hz when excited by striking the primary servo input. This may result in a small amplitude oscillation at the output of the primary servo, irrespective of whether the EMA gang was powered. When powered, the FBW servo assembly may still be moved through its whole range, however, the 40 Hz oscillation may still be present and added to larger displacement commands. The oscillation might not dampen out on its own, however, it may be easily stopped by touching the spool valve input.

Several techniques may be used to prevent the oscillation described above from occurring. For example, air pot or dashpot damping may be used. Air pots, or dashpots may be added with one end fixed to the primary servo body, and the other to the spool valve input. Air pots may use air as the working fluid to provide damping.

Another technique that may be used to prevent the oscillation described above from occurring is oil damping. Small oil-filled dampers may be affixed between the servo body and spool valve input in much the same fashion as the air pots described above. Small dampers may be placed on either side of the primary servo, one damper connected to each spool valve. The spool valves may be mechanically connected anyway through the feedback linkage of the primary servo. This means that one damper on either side may be able to damp the system. By installing two dampers, there was some redundancy in case one damper happens to fail.

Another technique that may be used to prevent the oscillation described above from occurring is friction damping.

Another technique that may be used to prevent the oscillation described above from occurring is mass damping. Mass may be added to the spool valve pushrods to attempt to prevent the vibrations.

In some embodiments, the EMA gangs may be mounted off of the primary servo, and have a pushrod connecting the EMA gang output to the input of the primary servo. This would mechanically be similar to how primary servos are connected on conventional helicopters, like the S76, S92, or S70 series helicopters. Pilot controls may connect with pushrods to the primary servos, after they pass through boost servos and mechanical mixing units. This approach may be used for a helicopter or fixed wing FBW system where there is sufficient room or space.

Different physical configurations may be used to integrate the EMA gang and the primary servo into a FBW servo. A given configuration may be selected to provide clearance from structure and equipment in different mounting positions.

In some embodiments, dissimilar primary servos may be controlled while retaining a common interface to the flight control computer. For example, a mechanical propeller controller is described in U.S. Pat. No. 7,758,310, the contents of which are incorporated by reference. In some embodiments, an EMA gang may be mounted in an airframe and a pushrod may be connected to the mechanical boosted input of the propeller controller.

Figure 8:
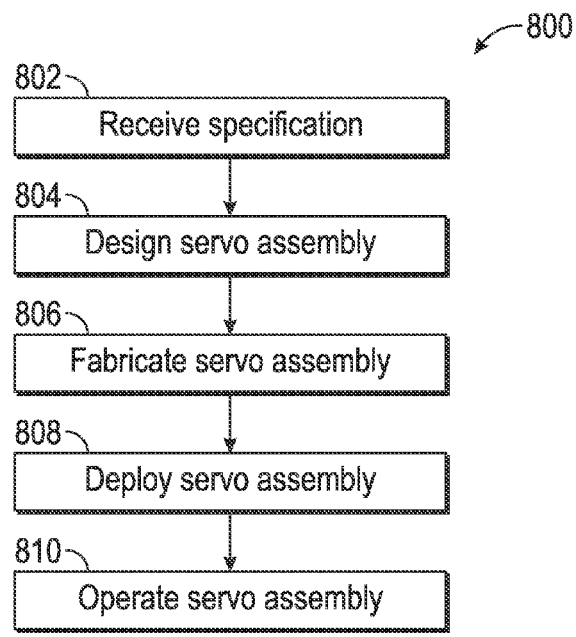
FIG. 8 illustrates a flow chart of an exemplary method.

Turning now to FIG. 8, a flow chart of an exemplary method 800 is shown. The method 800 may be executed by one or more systems, components, or devices, such as those described herein. The method 800 may be used to design, manufacture, deploy, and use a servo assembly.

In block 802, a specification may be received. The specification may include one or more requirements or parameters. The specification may identify an aircraft platform or configuration.

In block 804, a servo assembly may be designed. The servo assembly may adhere to the specification of block 802. The servo assembly may include one or more of the components or devices described herein (e.g., EMAs, EMA output arms, mounting structure, summation bar, sensors, sensor input arms, sensor positioning bars, idler linkage, idler arm, etc.).

In block 806, the designed servo assembly of block 804 may be fabricated. One or more manufacturing or machining techniques may be used in block 806.

In block 808, the fabricated servo assembly of block 806 may be deployed on, e.g., an aircraft. As part of the deployment, the servo assembly may be coupled to one or more FCCs.

In block 810, the servo assembly may be enabled or operated. As part of block 810, communication may be provided between the FCC(s) and the servo assembly. For example, the FCC(s) may communicate the servo assembly (or EMAs associated therewith) to one or more states or positions, and the servo assembly may provide feedback to the FCC(s) regarding the same. In some embodiments, the health of the servo assembly may be monitored and one or more actions may be taken in the event that the servo assembly, or a component thereof, fails.

The method 800 is illustrative. In some embodiments, one or more of the blocks or operations (or a portion thereof) may be optional. In some embodiments, one or more additional blocks or operations not shown may be included. In some embodiments, the blocks or operations may execute in an order or sequence that is different from what is shown in FIG. 8.

As described herein, embodiments of the disclosure may be used in connection with one or more aircraft types, such as X2 TECHNOLOGY helicopters.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A servo assembly comprising:
    a hydraulic primary servo;
    a plurality of electro-mechanical actuators coupled to the primary servo and configured to drive the primary servo;
    at least one device configured to perform loop closure; and
    a summation bar coupled to a plurality of output arms associated with the plurality of electro-mechanical actuators and configured to perform a mechanical averaging of differences in outputs of the electro-mechanical actuators.

2. The servo assembly of claim 1, wherein the loop closure comprises obtaining a difference between a desired ram position and an actual ram position driving a spool valve.

3. The servo assembly of claim 1, wherein the plurality of electro-mechanical actuators are configured to be run in parallel with one another.

4. The servo assembly of claim 1, wherein the servo assembly is configured to communicate with at least one flight control computer of an aircraft via a communication bus.

5. The servo assembly of claim 1, wherein the communication bus is configured to adhere to at least one of RS485, RS232, ARINC 629, and AFDX.

6. The servo assembly of claim 1, wherein each of the electro-mechanical actuators is controlled via a separate fly by wire channel.

7. The servo assembly of claim 1, wherein a stiffness and damping are selected for the summation bar relative to the electro-mechanical actuators.

8. The servo assembly of claim 1, wherein the at least one device comprises at least one sensor, and wherein the at least one sensor comprises at least one of: a rotary variable differential transformer and a linear variable differential transducer.

9. The servo assembly of claim 1, wherein the servo assembly is configured to calculate a torque associated with the plurality of electro-mechanical actuators.

10. The servo assembly of claim 9, further comprising:
a circuit configured to generate and output a discrete that indicates a status of the torque in terms of direction and magnitude.

11. A system comprising:
at least one flight control computer; and
at least one servo assembly coupled to the at least one flight control computer comprising:
a hydraulic primary servo;
a plurality of electro-mechanical actuators coupled to the primary servo and configured to drive the primary servo; and
at least one device configured to perform loop closure;
wherein the at least one servo assembly comprises a summation bar coupled to a plurality of output arms associated with the plurality of electro-mechanical actuators and configured to perform a mechanical averaging of differences in outputs of the electro-mechanical actuators.

12. The system of claim 11, wherein the at least one servo assembly is coupled to the at least one flight control computer via a serial communications bus, and wherein the at least one flight control computer is configured to issue commands to the at least one servo assembly via the serial communications bus, and wherein the at least one servo assembly is configured to provide feedback to the at least one flight control computer via the serial communications bus.

13. The system of claim 11, wherein the at least one device comprises at least one sensor configured to support obtaining difference between a desired ram position and an actual ram position driving a spool valve.

14. The system of claim 11, wherein the plurality of electro-mechanical actuators are configured to be run in parallel with one another.

15. A method comprising:
obtaining a first analog signal corresponding to a position error between a commanded gang output of a plurality of electro-mechanical actuators configured to be run in parallel with one another and a measured gang output of the plurality of electro-mechanical actuators;
obtaining a second analog signal corresponding to an output torque; and
processing, by a circuit, the first analog signal and the second analog signal to generate and output a discrete that indicates a status of the torque in terms of direction and magnitude;
wherein the second analog signal corresponds to a difference between a position of one of the electro-mechanical actuators and the measured gang output.

16. The method of claim 15, further comprising:
turning off one of the electro-mechanical actuators based on determining that the one of the electro-mechanical actuators is subject to a fault mode.

17. The method of claim 16, wherein the one of the electro-mechanical actuators is turned off by at least one of: a first discrete input associated with a first flight control computer and a master disable input control by a second flight control computer, wherein the first and second flight control computers are dissimilar computers.

* * * * *